(12) United States Patent
Elsasser et al.

(10) Patent No.: US 11,104,221 B2
(45) Date of Patent: Aug. 31, 2021

(54) FUEL TANK HAVING A STIFFENING STRUCTURE

(71) Applicant: KAUTEX TEXTRON GMBH & CO. KG, Bonn (DE)

(72) Inventors: Carsten Elsasser, Pulheim, DE (US); Sebastian Rosenstrater, Koln, DE (US)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 16/306,897

(22) PCT Filed: May 22, 2017

(86) PCT No.: PCT/EP2017/062279
§ 371 (c)(1),
(2) Date: Mar. 27, 2019

(87) PCT Pub. No.: WO2017/207324
PCT Pub. Date: Dec. 7, 2017

(65) Prior Publication Data
US 2019/0263255 A1    Aug. 29, 2019

(30) Foreign Application Priority Data
Jun. 1, 2016 (DE) .......................... 102016209544.7

(51) Int. Cl.
*B60K 15/03* (2006.01)
(52) U.S. Cl.
CPC ........ *B60K 15/03177* (2013.01); *B60K 15/03* (2013.01)
(58) Field of Classification Search
CPC ..... B60K 15/03177; B60K 15/03; F17C 1/16; F17C 2201/0128; F17C 2203/067;
(Continued)

(56) References Cited

U.S. PATENT DOCUMENTS 3,251,500 A * 5/1966 Archbold .................. F17C 1/16
220/562
4,171,999 A * 10/1979 Allen ..................... B65D 90/08
156/174
(Continued)

FOREIGN PATENT DOCUMENTS

CN 102341260 A 2/2012
CN 105073471 A 11/2015
(Continued)

OTHER PUBLICATIONS

International Search Report issued in WO 2017/207324 A1 filed Dec. 27, 2017 which claims priority from PCT/EP2017/062279 filed May 22, 2017.
(Continued)

*Primary Examiner* — Shawn M Braden
(74) *Attorney, Agent, or Firm* — Wiley Rein LLP

(57) ABSTRACT

The present invention discloses a fuel tank for a motor vehicle, with a tank wall bounding a fuel tank interior, characterized by the following features: the fuel tank has a first fiber-reinforced stiffening structure and a second fiber-reinforced stiffening structure; the first stiffening structure is connected to an inner surface of the tank wall, said inner surface facing the fuel tank interior, and the second stiffening structure is connected to an outer surface of the tank wall, said outer surface facing away from the fuel tank interior; and the tank wall is arranged at least in sections in a sandwich-like manner between the first stiffening structure and the second stiffening structure such that the first stiffening structure and the second stiffening structure are arranged overlapping at least in sections.

15 Claims, 6 Drawing Sheets

(58) Field of Classification Search
CPC ........ F17C 2260/011; F17C 2270/0171; F17C 2209/227
USPC ....................................................... 220/562
See application file for complete search history.

(56) References Cited

U.S. PATENT DOCUMENTS

| | | | |
|---|---|---|---|
| 4,552,281 A | 11/1985 | Schneider | |
| 6,186,723 B1* | 2/2001 | Murata | H01L 21/67772 414/217 |
| 2009/0250458 A1* | 10/2009 | Criel | B29C 49/04 220/4.13 |
| 2013/0082062 A1* | 4/2013 | Kawamoto | B60K 15/073 220/562 |
| 2014/0026990 A1* | 1/2014 | Delihas | B60K 15/03 137/558 |

FOREIGN PATENT DOCUMENTS

| | | |
|---|---|---|
| DE | 102009013514 A1 | 9/2010 |
| DE | 102009039888 A1 | 3/2011 |
| DE | 102010044584 A1 | 3/2012 |
| DE | 102012010058 A1 | 11/2013 |
| DE | 102012010447 A1 | 11/2013 |
| DE | 102013004929 A1 | 9/2014 |
| DE | 102013012687 A1 | 2/2015 |
| JP | 8-508687 A | 9/1996 |
| KR | 10-20090037768 A | 4/2009 |
| WO | 9416882 | 8/1994 |
| WO | 2013/174461 A1 | 11/2013 |
| WO | 2013174460 A1 | 11/2013 |

OTHER PUBLICATIONS

Prof.Dr.-Ing. Christian Brecher, et al., "Herstellung von belastunas-optimierten thermoplastischen Faserverbundbauteilen", Leichtbau—Technologien im Automobilbau, ATZ/MTZ-Fachbuch, 2014, six pages.

"International Preliminary Report on Patentability and Written Opinion received for PCT Application No. PCT/ EP2017/062279, dated Dec. 13, 2018", 13 pages (7 pages of English Translation and 6 pages of Official Copy).

* cited by examiner

FUEL TANK HAVING A STIFFENING STRUCTURE

RELATED APPLICATIONS

This application is a § 371 National Stage Application of PCT/EP2017/062279, filed May 22, 2017, which claims priority benefit of German Patent Application No. 102016209544.7, filed Jun. 1, 2016, which applications are incorporated entirely by reference herein for all purposes.

FIELD

The present invention relates to an operating liquid tank having a stiffening structure.

BACKGROUND ART

Operating liquid tanks made of thermoplastic material in the context of the invention are especially, but not exclusively, fuel tanks for motor vehicles, windshield wiper water tanks, oil tanks, secondary liquid tanks or additive tanks for motor vehicles. Tanks of the type specified at the outset are frequently produced by extrusion blow molding, and HDPE (high-density polyethylene) in particular is suitable for the production of extrusion blow-molded tanks.

In motor vehicles having an internal combustion engine, when an operating liquid tank, especially the fuel tank, is subjected to heat, the operating liquid, for example the fuel, is likewise heated, and so there is a rise in the vapor pressure of the operating liquid and the operating liquid tank is subjected to a corresponding internal pressure, as a result of which the fuel tank is subject to deformation.

For ventilation of an operating liquid tank in the form of a fuel tank, it has a fluid connection to a fuel vapor filter for filtering out fuel vapors. The fuel vapor filter may take the form, for example, of an activated carbon filter. In the operation of the internal combustion engine, the activated carbon filter is purged by means of intake air, such that fuel vapors bound in the activated carbon can be supplied to the internal combustion engine.

In hybrid motor vehicles, moreover, there is a further problem caused by the reduced operating time of the internal combustion engine. Owing to the reduced operating time of the internal combustion engine, an activated carbon filter in fluid connection to the fuel tank is correspondingly purged to a lesser degree, such that it is also possible to purge out less fuel vapor bound in the activated carbon. The result of this can be that activated carbon filters in hybrid motor vehicles have to have greater dimensions. Moreover, as a result of removal of air from the fuel tank via the activated carbon filter, owing to the pressure drop, further fuel is converted to the vapor phase within the fuel tank, and so it would be advantageous for the fuel tank to have a stiffer and/or more pressure-resistant design. This is because fluid separation of the fuel tank from the activated carbon filter is then possible by means of a controllable valve, which means that the activated carbon filter is laden with less fuel vapor.

The aim is therefore to increase the pressure resistance of operating liquid tanks, especially of fuel tanks and particularly of fuel tanks for hybrid motor vehicles. Fuel tanks for hybrid motor vehicles should preferably be able to withstand a positive pressure of up to 400 mbar (millibar) or more and a negative pressure of about 150 mbar or more.

The prior art discloses strengthening an operating liquid tank by means of a stiffening element arranged between two opposite operating liquid tank walls, wherein the stiffening element is bonded to the operating liquid tank walls. A corresponding operating liquid tank is known from DE 10 2013 012 687 A1. This operating liquid tank has elevated structural stability both under elevated pressure and under reduced pressure. However, a disadvantage of this mode of stiffening is that the operating liquid tank interior is no longer entirely freely utilizable.

SUMMARY OF THE INVENTION

It is an object of the present invention to provide an operating liquid tank that can withstand elevated positive and negative pressures and which, when pressurized, has reduced deformation, and it should simultaneously be assured that an operating liquid tank interior remains utilizable with reduced restrictions or none.

The object underlying the present invention is achieved by an operating liquid tank having the features of claim 1. Advantageous configurations of the operating liquid tank are described in the claims dependent on claim 1.

More specifically, the object underlying the present invention is achieved by an operating liquid tank for a motor vehicle having a tank wall that bounds an operating liquid tank interior, wherein the operating liquid tank is characterized in that it has a first fiber-reinforced stiffening structure and a second fiber-reinforced stiffening structure, wherein the first stiffening structure is bonded to an inner face of the tank wall that faces the operating liquid tank interior, and the second stiffening structure is bonded to an outer face of the tank wall that faces away from the operating liquid tank interior, and wherein the tank wall, at least in sections, is in a sandwichlike arrangement between the first stiffening structure and the second stiffening structure, in such a way that the first stiffening structure and the second stiffening structure, at least in sections, are in an overlapping arrangement.

The operating liquid tank of the invention has manifold advantages. Owing to the sandwichlike arrangement of the tank wall between the first and second stiffening structures, the tank wall has elevated flexural strength in both directions of flexion, such that the operating liquid tank of the invention has reduced deformation both under positive pressure and under negative pressure in the operating liquid tank interior (compared to ambient pressure). Thus, the operating liquid tank of the invention can withstand both relatively high positive pressures and relatively high negative pressures.

Owing to the elevated stiffness of the operating liquid tank of the invention, it has considerably reduced deformation under positive pressure stress and/or under negative pressure stress. This enables installation of the operating liquid tank of the invention in a motor vehicle with a reduced distance from chassis components and/or from other motor vehicle components. This allows improved utilization of the design space available in a motor vehicle for installation of the operating liquid tank, such that, for a given design space in a motor vehicle, the operating liquid tank of the invention has increased capacity.

Moreover, the operating liquid tank of the invention offers the advantage that the interior thereof is utilizable at least with fewer restrictions, if any, since there is no need for a stiffening pillar to be disposed in the interior of the operating liquid tank.

The operating liquid tank of the invention, in spite of elevated stiffness, has a lower weight compared to operating liquid tanks known from the prior art. The operating liquid tank of the invention may be reinforced by means of stiffening structures locally and/or in a stress-dependent manner. Moreover, the operating liquid tank of the invention can be produced inexpensively.

A further advantage of the operating liquid tank of the invention is the property that, on cooling of the operating liquid tank after production thereof (by a blow molding process or by an injection molding process), the tank wall thereof has reduced warpage since the tank wall has been provided with a stiffening structure not just on one side, i.e. on its outer face or its inner face, but has been provided with a stiffening structure both on the outer face and on the inner face.

If the operating liquid tank takes the form of a fuel tank, especially of a fuel tank for gasoline fuels, the operating liquid tank of the invention has excellent barrier properties for hydrocarbons since the stiffening structures do not damage a barrier layer (for example an EVOH layer) in the tank wall and do not impair the functionality thereof.

The feature that the tank wall, at least in sections, is in a sandwichlike arrangement between the first stiffening structure and the second stiffening structure, in such a way that the first stiffening structure and the second stiffening structure, at least in sections, are in an overlapping arrangement is equivalent to the feature that an area normal of the tank wall, in an overlap region with the first stiffening structure and/or with the second stiffening structure, penetrates the first stiffening structure and the second stiffening structure. This means that, in top view of the tank wall, i.e. in a viewing direction parallel to the area normal of the tank wall, the first stiffening structure and the second stiffening structure overlap. In other words, the area normal of the tank wall, in the region of the tank wall bonded to the first stiffening structure and to the second stiffening structure, penetrates both the first stiffening structure and the second stiffening structure.

In the event of deformation of the tank wall caused by positive internal pressure, the second stiffening structure absorbs tensile forces and the first stiffening structure compressive forces. In the event of deformation of the tank wall caused by negative internal pressure, the first stiffening structure absorbs tensile forces and the second stiffening structure compressive forces.

The operating liquid tank is preferably formed from a thermoplastic material. If the operating liquid tank takes the form of a fuel tank, the tank wall(s) may be formed from a material layer system comprising an inner layer in the form of an HDPE layer, an adhesion promoter layer in the form of an LDPE layer, a barrier layer in the form of an EVOH layer, a further adhesion promoter layer in the form of an LDPE layer and an outer layer in the form of a further HDPE layer or a recycled material layer.

The fiber reinforcement in the first and second stiffening structures is effected by means of reinforcing fibers which can also be referred to as fiber material. The fiber material preferably includes glass fibers and/or carbon fibers and/or polymer fibers and/or aramid fibers and/or natural fibers (for example flax fibers) and/or another suitable fiber material.

The first and second stiffening structures preferably have a thermoplastic or thermoset matrix or matrix material into which the fiber material has been embedded.

The fiber-reinforced stiffening structures can absorb tensile forces and can thus be referred to as tensile stiffening structures or reinforcing devices. Preferably, the stiffening structures can also absorb compressive forces and can thus be referred to as tensile and/or pressure-resistant stiffening structures or reinforcing devices.

It will be appreciated that the operating liquid tank of the invention may also include multiple first fiber-reinforced stiffening structures and multiple second fiber-reinforced stiffening structures, where the first stiffening structures are bonded to the inner face of the tank wall and the second stiffening structures to the outer face of the tank wall.

The first stiffening structure(s) is/are bonded to the inner face of the tank wall preferably over the full area, i.e. in such a way that the entire bond area of the first stiffening structure(s) opposite the inner face of the tank wall is bonded to the inner face of the tank wall. This bond is preferably cohesive, for example by means of a weld. The second stiffening structure(s) is/are bonded to the outer face of the tank wall preferably over the full area, i.e. in such a way that the entire bond area of the second stiffening structure(s) opposite the outer face of the tank wall is bonded to the outer face of the tank wall. This bond is preferably cohesive, for example by means of a weld.

In addition, it is also possible that the bond of the first stiffening structure(s) to the inner face of the tank wall is preferably over part of the area. Moreover, it is also possible that the bond of the second stiffening structure(s) to the outer face of the tank wall is preferably over part of the area.

Preferably, the operating liquid tank is in such a form that the tank wall is in a sandwichlike arrangement between the first stiffening structure and the second stiffening structure, in such a way that, in a top view of the tank wall, the first stiffening structure and the second stiffening structure run flush to one another.

An operating liquid tank of corresponding design is increased in stiffness once again, such that it can withstand elevated positive pressures and negative pressures and has lower deformation in the event of positive pressurization and negative pressurization. These advantages are achieved in spite of a lower weight of the operating liquid tank.

When the tank wall is arranged in a plane defined by an x axis and a y axis at right angles thereto, the feature that, in a top view of the tank wall, the first stiffening structure and the second stiffening structure run flush to one another is equivalent to the feature that the first stiffening structure has the same extent in x direction and in y direction as the second stiffening structure.

Consequently, the boundary edges of the first stiffening structure and of the second stiffening structure run flush to one another.

Further preferably, the operating liquid tank is designed such that the first stiffening structure takes the form of a fiber-reinforced tensile first ribbon, and/or that the second stiffening structure takes the form of a fiber-reinforced tensile second ribbon.

Preferably, the first ribbon takes the form of a tensile and pressure-resistant ribbon, such that both tensile forces and compressive forces are transmittable by means of the first ribbon. Preferably, the second ribbon takes the form of a tensile and pressure-resistant ribbon, such that both tensile forces and compressive forces are transmittable by means of the second ribbon.

An operating liquid tank of corresponding design can thus be reinforced/stiffened in a particularly simple manner, such that the deformation properties caused by the geometry of the operating liquid tank can be improved in a controlled manner. This is because the ribbons can be bonded selectively to the inner face and the outer face of the tank wall(s) in regions of the operating liquid tank that would be subjected to great deformation in the event of positive pressurization and/or in the event of negative pressurization if these regions were not reinforced with the ribbons that can also be referred to as stiffening ribbons or reinforcing ribbons.

The fiber-reinforced tensile and/or pressure-resistant ribbon may have a material matrix made of a thermoplastic or thermoset material in which the fiber material has been embedded in the form of glass fibers and/or carbon fibers and/or polymer fibers and/or aramid fibers and/or natural fibers.

Preference is given to an alignment of reinforcing fibers in the first ribbon parallel to a direction of longitudinal extent of the first ribbon. Further preferable is an alignment of reinforcing fibers of the second ribbon parallel to a direction of longitudinal extent of the second ribbon.

The parallel alignment of the reinforcing fibers to the direction of longitudinal extent of the ribbon means an essentially parallel alignment of the reinforcing fibers to the direction of longitudinal extent of the ribbon.

The reinforcing fibers may be glass fibers and/or carbon fibers and/or polymer fibers and/or aramid fibers and/or natural fibers and/or other suitable reinforcing fibers.

In a further advantageous configuration, the operating liquid tank is designed such that the first stiffening structure takes the form of a first organosheet, and/or that the second stiffening structure takes the form of a second organosheet.

An operating liquid tank of corresponding design offers the advantage that the respective stiffening structures in the form of organosheets can absorb multidirectional tensile and/or compressive forces in an improved manner. This is because the reinforcing fibers are in a multidirectional arrangement in the respective organosheets. Preferably, the reinforcing fibers in an organosheet are in a perpendicular arrangement to one another.

Organosheets are fiber composite materials and therefore semifinished fiber matrix products. They consist of a fiber weave or a fiber scrim embedded into a typically thermoplastic matrix. Fiber materials that are frequently used are glass, aramid and carbon. In the case of weaves and scrims, the fibers may also run at right angles to one another.

Further preferably, the operating liquid tank is designed in such a way that the first stiffening structure is secured to two spaced-apart securing regions on the inner face of the tank wall, and/or that the second stiffening structure is secured to two spaced-apart securing regions on the outer face of the tank wall.

An operating liquid tank of corresponding design can be produced in a particularly rapid and simple manner since the respective stiffening structures merely have to be bonded to the tank wall at two spaced-apart regions or anchor points. The stiffening structures can additionally absorb tensile forces resulting from deformation of the tank wall and hence counteract deformation of the tank wall.

When the first and second stiffening structures are designed as first and second tensile and fiber-reinforced ribbons, the reinforcing fibers of the ribbons preferably run in a first direction of extent of a bonding line of the two spaced-apart securing regions.

It will be appreciated that it is also possible that the first stiffening structure is also secured on the inner face of the tank wall to more than two spaced-apart securing regions, and/or that the second stiffening structure is also secured on the outer face of the tank wall to more than two spaced-apart securing regions.

Preferably, the operating liquid tank is designed in such a way that the first stiffening structure is bonded on the inner face of the tank wall along a bonding line having at least one extension component that runs at right angles to a fiber direction of reinforcing fibers within the first stiffening structure. Further preferably, the operating liquid tank is designed in such a way that the second stiffening structure is bonded on the outer face of the tank wall along a bonding line having at least one extension component that runs at right angles to a fiber direction of reinforcing fibers within the second stiffening structure.

For example, the stiffening structures may be bonded to the tank wall by means of a zigzag line.

Preferably, the operating liquid tank is designed in such a way that the first stiffening structure is in a circumferential arrangement within the operating liquid tank, and/or that the second stiffening structure is in a circumferential arrangement within the operating liquid tank.

The operating liquid tank of corresponding design is increased in stiffness once again, such that it can withstand elevated positive pressures and negative pressures and has lower deformation in the event of positive pressurization and negative pressurization.

In a further advantageous configuration, the operating liquid tank has at least two first fiber-reinforced stiffening structures, each of which is bonded to the inner face of the tank wall that faces the operating liquid tank interior, where the two first stiffening structures are in a crossed arrangement such that the reinforcing fibers thereof run at an angle, preferably at right angles, to one another. Preferably, the at least two first reinforcing structures are bonded to one another in a contact region in which the two first reinforcing structures overlap one another.

Further preferably, the operating liquid tank has at least two second fiber-reinforced stiffening structures, each of which is bonded to the outer face of the tank wall that faces away from the operating liquid tank interior, where the two second stiffening structures are in a crossed arrangement such that the reinforcing fibers thereof run at an angle, preferably at right angles, to one another. Preferably, the at least two second reinforcing structures are bonded to one another in a contact region in which the two second reinforcing structures overlap one another.

The two last-described designs of the operating liquid tank are increased in stiffness once again, such that they can withstand elevated positive pressures and negative pressures and have lower deformation in the event of positive pressurization and negative pressurization. This is because the stiffening structures can absorb tensile forces and/or compressive forces with different, preferably perpendicular, force components.

It will be appreciated that the first stiffening structures and the second stiffening structures, in a top view of the tank wall/of the respective tank walls to which they are bonded, may be in an overlapping arrangement, preferably flush to one another.

Preferably, the operating liquid tank is designed such that the first stiffening structure and/or the second stiffening structure is/are cohesively bonded to the tank wall.

For example, a stiffening structure comprising a thermoplastic is cohesively bondable to one made of a thermoplastic which is compatible for welding purposes. For example, the stiffening structures may include a matrix material comprising HDPE or LDPE or consisting of HDPE or LDPE which is weldable to a tank wall comprising HDPE or consisting of HDPE.

Preferably, the stiffening structures can be bonded to the tank wall(s) in what is called the first heat, by applying the stiffening structures to the still warm and plastic tank wall and optionally pressing them in, such that the stiffening structures are welded to the tank wall.

However, it is also possible that the stiffening structures and/or the tank wall, after the operating liquid tank has cooled down, are heated and then placed onto and optionally pressed into the tank wall.

A cohesive bond of the stiffening structures to the tank wall(s) is also enabled by means of an adhesive bond of the stiffening structures to the tank wall(s).

In a further possible configuration of the operating liquid tank, the first stiffening structure is bonded to the tank wall by means of an adhesion promoter layer disposed between the first stiffening structure and the inner face of the tank wall. Further preferably, the second stiffening structure is bonded to the tank wall by means of an adhesion promoter layer disposed between the second stiffening structure and the outer face of the tank wall.

The operating liquid tank of corresponding design offers the advantage that the materials of the tank wall and of the stiffening structures (the matrix material thereof) need not necessarily be compatible with one another for welding purposes. There is therefore a greater degree of freedom in the selection of the matrix material for the stiffening structures.

In a further advantageous configuration of the operating liquid tank, it is configured such that the first stiffening structure is bonded to the tank wall by means of a rivet bond that penetrates the first stiffening structure. Further preferably, the second stiffening structure is bonded to the tank wall by means of a rivet bond that penetrates the second stiffening structure.

The operating liquid tank of corresponding design offers the advantage that the materials of the tank wall and of the stiffening structures (the matrix material thereof) need not necessarily be compatible with one another for welding purposes. There is therefore a greater degree of freedom in the selection of the matrix material for the stiffening structures. For rivet bonding of the stiffening structure to the tank wall, the stiffening structure preferably has a passage orifice through which a rivet pin is conducted, the rivet pin being formed from a material weldable to the material of the tank wall, especially to the outer layers of the tank wall.

In a further advantageous configuration of the operating liquid tank, the first stiffening structure has at least one first bonding pin that faces the inner face of the tank wall and has a first undercut, where the first bonding pin has penetrated into the tank wall such that the first undercut has merged into the tank wall and the first stiffening structure is bonded in a form-fitting manner to the tank wall. Further preferably, the second stiffening structure has at least one second bonding pin that faces the outer face of the tank wall and has a second undercut, where the second bonding pin has penetrated into the tank wall such that the second undercut has merged into the tank wall and the second stiffening structure is bonded in a form-fitting manner to the tank wall.

The operating liquid tank of corresponding design also offers the advantage that the materials of the tank wall and of the stiffening structures need not be compatible with one another for welding purposes. Moreover, reliable bonding of the stiffening structures on the tank wall is assured.

The reinforcing structures preferably have a multitude of bonding pins with undercuts that are each merged into the tank wall in the bonded state therewith. For example, the bonding pins may take the form of hooks in the manner of a hook-and-loop connection.

For example, the matrix material of the stiffening structures may be or comprise a thermoset material, whereas the tank wall, especially the outer layers of the tank wall, are formed from a thermoplastic material.

BRIEF DESCRIPTION OF THE DRAWINGS

Further advantages, details and features of the invention are apparent hereinafter from the working examples elucidated. The individual figures show.

DETAILED DESCRIPTION OF THE EMBODIMENTS

Figure 1:
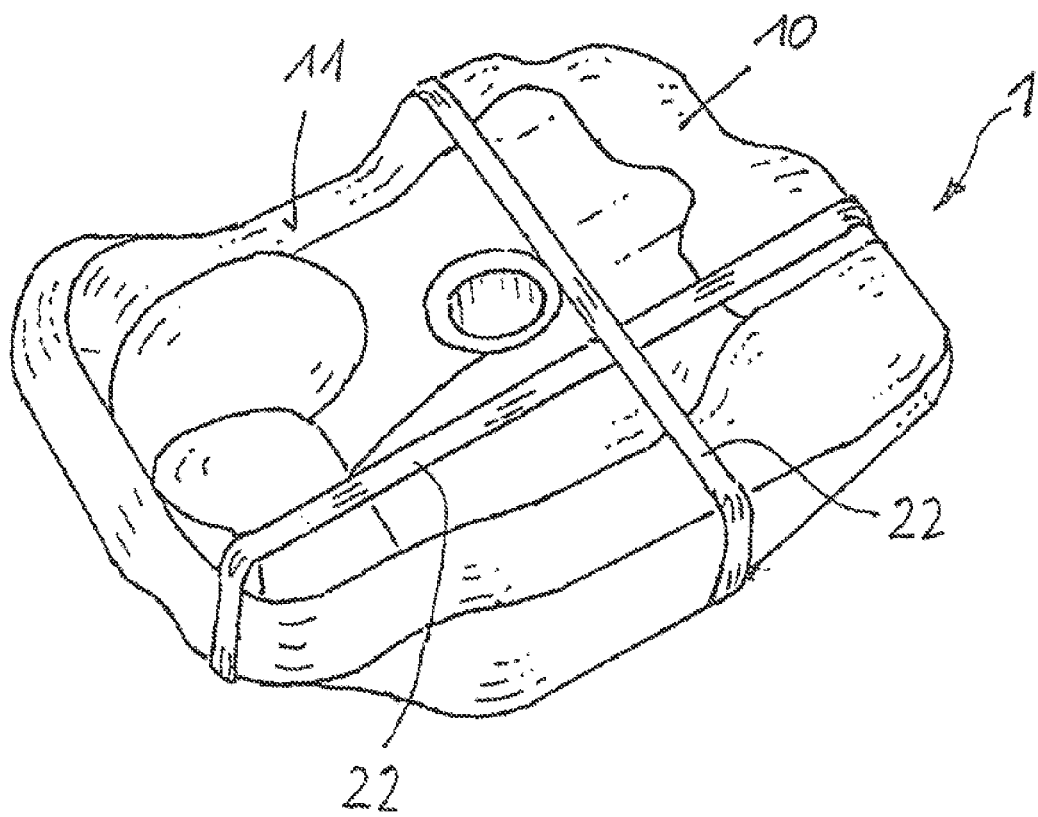
FIG. 1: a perspective representation of the outside of an operating liquid tank of the invention.

In the description that now follows, identical reference numerals denote identical components and identical features, and so a description with regard to one component which is given in relation to one figure is also applicable to the other figures, such that repetitive description is avoided. Moreover, individual features that have been described in connection with one embodiment are also usable separately in other embodiments.

FIG. 1 shows a schematic perspective representation of an operating liquid tank 1 of the invention. The operating liquid tank 1 has a tank wall 10 that bounds an operating liquid tank interior 13. It is clear that the operating liquid tank 1, in the working example shown, has two second stiffening structures 22 that take the form of two tensile ribbons 22 in the working example shown. The second tensile ribbons 22 are bonded here to an outer face 12 of the tank wall 10 facing away from the operating liquid tank interior 13. It is also apparent from FIG. 1 that the second tensile ribbons 22 are in a mutually crossed arrangement, and so reinforcing fibers of the tensile ribbons 22 that are not shown in the figures run at right angles to one another. This is because the reinforcing fibers of the second tensile ribbons 22 run parallel to the direction of longitudinal extent of the second tensile ribbons 22. However, it is not apparent from FIG. 2 that the operating liquid tank 1 also has a first stiffening structure 21 arranged within the operating liquid tank 1.

Figure 2:
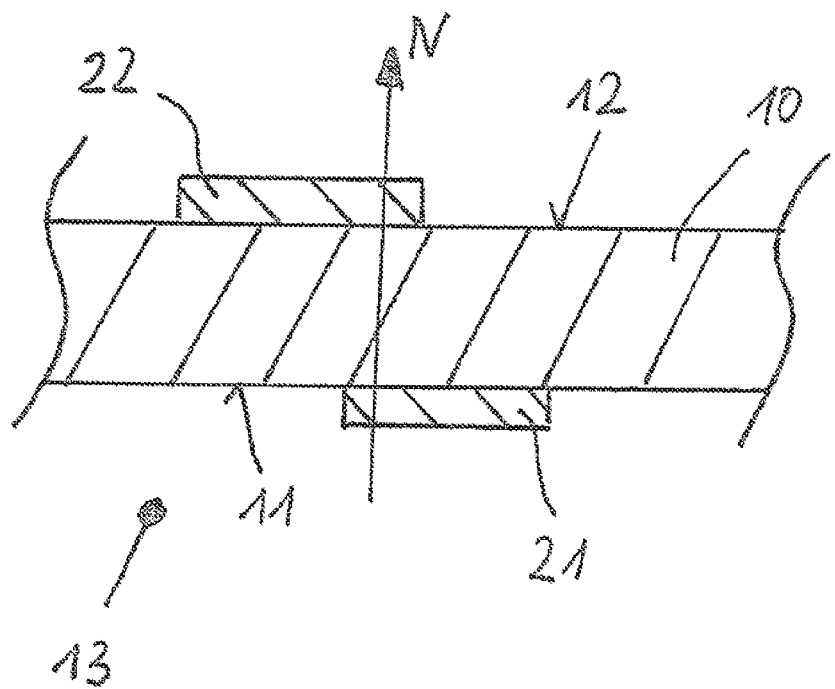
FIG. 2: a cross-sectional representation of a tank wall of the operating liquid tank of the invention.

FIG. 2 shows a schematic cross-sectional representation of a tank wall 10 of an operating liquid tank 1 of the invention. It is clear that the operating liquid tank 1 has a first fiber-reinforced stiffening structure 21 and a second fiber-reinforced stiffening structure 22. In the working example shown in FIG. 2, the stiffening structures 21 also take the form of tensile ribbons 21, 22. The first reinforcing structure 21 is bonded to an inner face 11 of the tank wall 10 facing the operating liquid tank interior 13, and the second stiffening structure 22 is bonded to an outer face 12 of the tank wall 10 facing away from the operating liquid tank interior 13. Sections of the tank wall 10 are in a sandwichlike arrangement between the first stiffening structure 11 and the second stiffening structure 12 in such a way that the first stiffening structure 11 and the second stiffening structure 12 are in an overlapping arrangement at least in sections.

The feature that the tank wall 10, at least in sections, is in a sandwichlike arrangement between the first stiffening structure 21 and the second stiffening structure 22, in such a way that the first stiffening structure 21 and the second stiffening structure 22, at least in sections, are in an overlapping arrangement is equivalent to the feature that an area normal N of the tank wall 10, in an overlap region with the first stiffening structure 21 and/or with the second stiffening structure 22, penetrates the first stiffening structure 21 and the second stiffening structure 22. It is clear from FIG. 2 that, in a viewing direction parallel to the area normal N, the first stiffening structure 21 and the second stiffening structure 22 overlap; in other words, the area normal N of the tank wall 10 penetrates both the first stiffening structure 21 and the second stiffening structure 22.

Figure 3A:
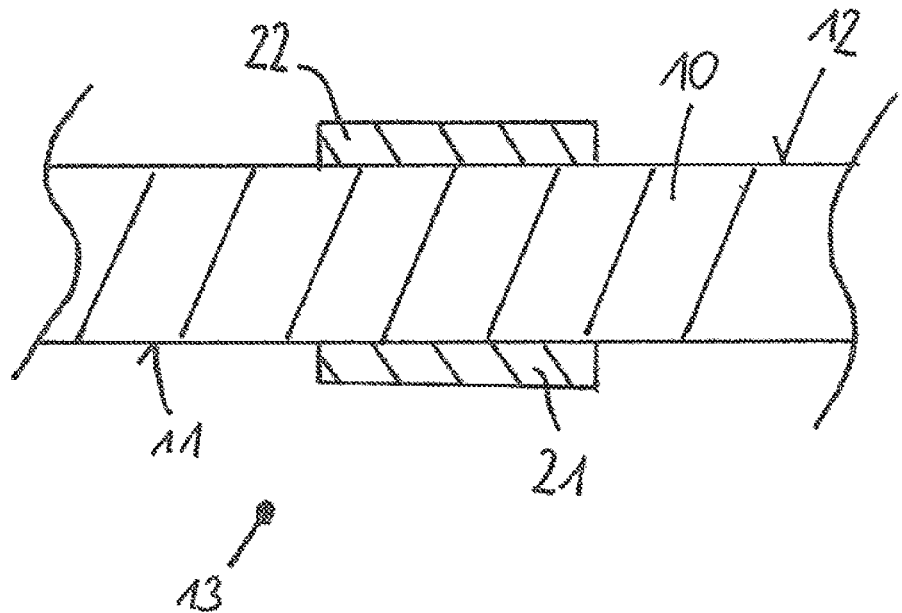
FIG. 3A: a cross-sectional representation of a tank wall in an alternative embodiment of the operating liquid tank of the invention.
Figure 3B:
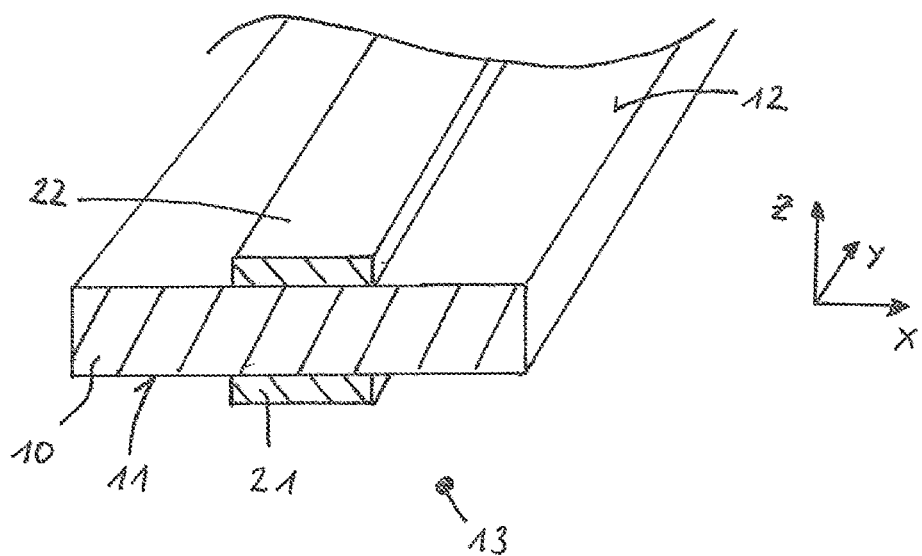
FIG. 3B: a schematic perspective representation of the tank wall shown in FIG. 3A.

FIG. 3A shows a schematic cross-sectional representation of a tank wall 10 of an operating liquid tank 1 in modified form. FIG. 3B shows the tank wall 10 represented in FIG. 3A in a schematic perspective representation. It is clear from FIGS. 3A and 3B that the tank wall 10 is in a sandwichlike arrangement between the first stiffening structure 11 and the second stiffening structure 12 in such a way that, in a top view of the tank wall 10, the first stiffening structure 21 and the second stiffening structure 22 run flush to one another. The respective boundary edges of the first stiffening structure 21 and of the second stiffening structure 22, in top view, are consequently likewise aligned flush to one another and to the operating liquid tank wall 10.

It is clear from FIG. 3B that the tank wall 10 is arranged in a plane formed by an x axis and a y axis. Accordingly, the feature that, in a top view of the tank wall 10, the first stiffening structure 21 and the second stiffening structure 22 run flush to one another is equivalent to the feature that the first stiffening structure has the same extent in x direction and in y direction as the second stiffening structure 22.

Figure 4:
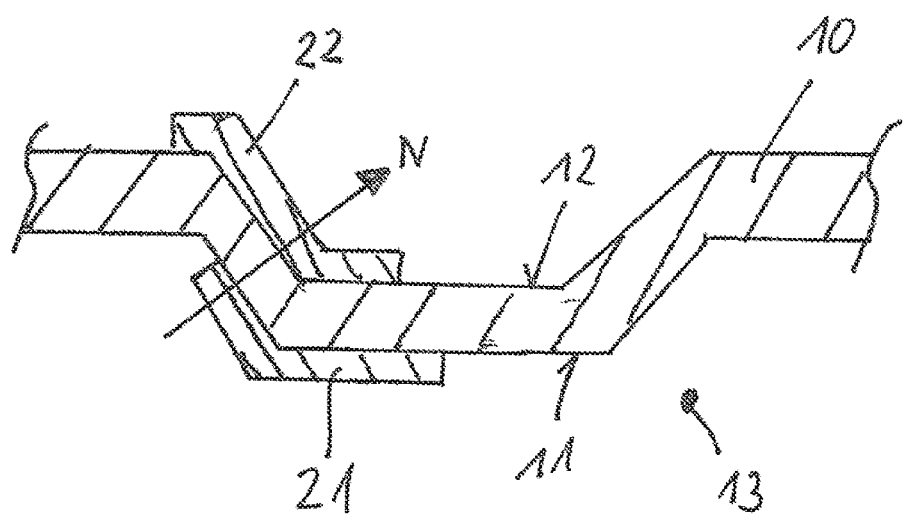
FIG. 4: a cross-sectional representation of a tank wall in a further alternative embodiment of the operating liquid tank of the invention.

FIG. 4 shows a cross section through a tank wall 10 of an operating liquid tank 1 in a further embodiment. It is clear that the operating liquid tank 1 has a depression. The first stiffening structure 21 is bonded to the inner face 11 of the tank wall 10 in the region of the depression, and the second stiffening structure 22 is bonded to the outer face 12 of the tank wall 10 both in the region of the depression and in a region outside the depression. It is clear that an area normal N of the tank wall 10 in the region of the side flanks of the depression penetrates both the first stiffening structure 21 and the second stiffening structure 22.

Figure 5A:
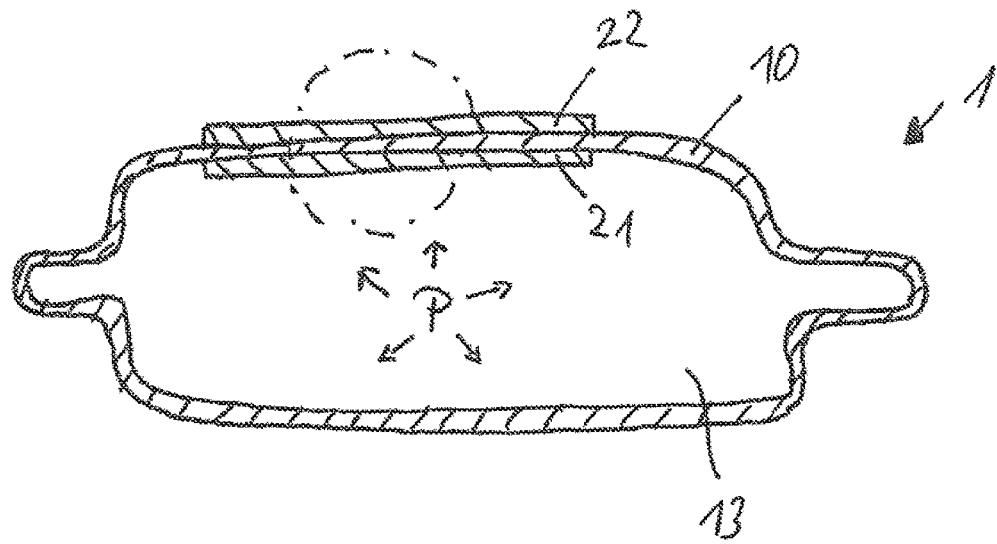
FIG. 5A: a schematic cross-sectional representation of an operating liquid tank of the invention.

FIG. 5A shows a schematic of an operating liquid tank 1 of the invention in cross section. It is indicated that the operating liquid tank 1 is subject to an internal positive pressure P. The tank wall 10 shown at the top in FIG. 5A is bonded to a first stiffening structure 21 and a second stiffening structure 22. The contact region of the first stiffening structure 21 with the tank wall 10 and of the second stiffening structure 22 with the tank wall 10 is shown in enlarged form in FIG. 5B.

Figure 5B:
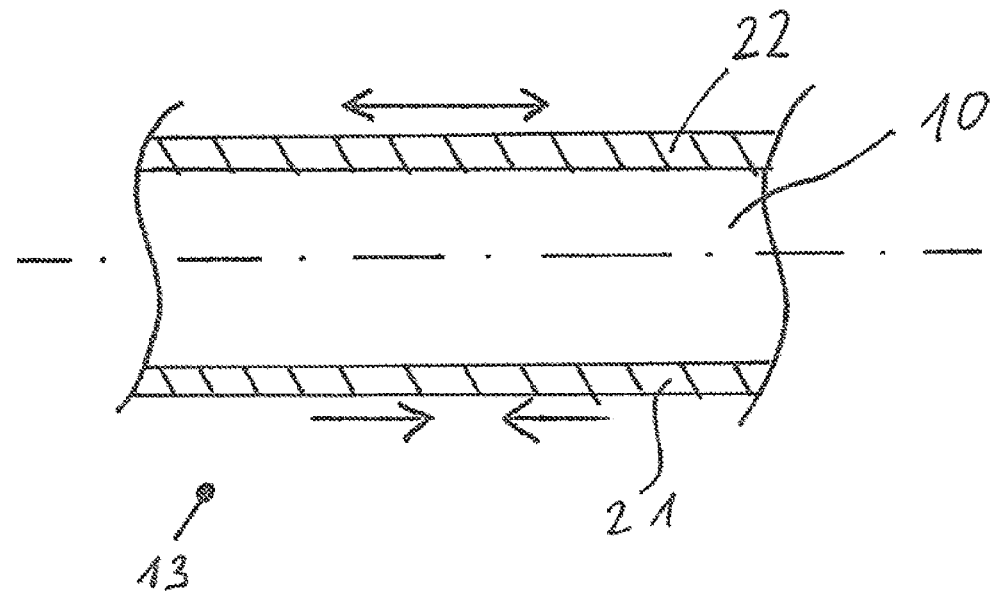
FIG. 5B: a detail view of the area encircled in FIG. 5A.

It is clear from FIG. 5B that, in the event of internal pressurization, i.e. in the event of a positive pressure within the operating liquid tank interior 13 by comparison with the ambient pressure, the second stiffening structure 22 is put under tensile stress (see arrowheads pointing away from one another in the region of the second stiffening structure 22) and the first stiffening structure 21 is put under pressure (see arrows pointing toward one another in the region of the first stiffening structure 21).

If, on the other hand, the operating liquid tank interior 13 is at a lower internal pressure than the ambient pressure of the operating liquid tank 1, the second reinforcing structure 22 would be put under pressure, whereas the first stiffening structure 21 would be put under tensile stress.

Figure 6:
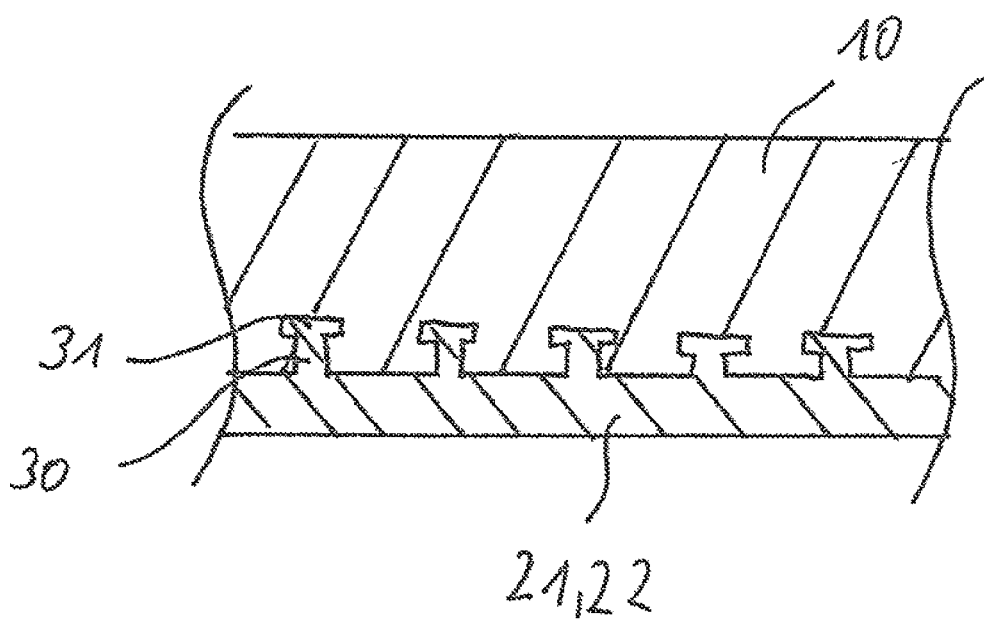
FIG. 6: a cross-sectional representation of a tank wall of an operating liquid tank in a further embodiment of the present invention.

FIG. 6 shows, in a schematic manner, a section through an operating liquid tank wall 10 of an operating liquid tank 1 in a further embodiment. It is clear that the first stiffening structure 21 and/or the second stiffening structure 22 has/have a multitude of bonding pins 30, each of which has an undercut 31. The respective bonding pins 30 have penetrated into the tank wall 10, such that the respective undercuts 31 have merged into the tank wall 10 and the stiffening structure 21, 22 has been bonded in a form-fitting manner to the tank wall 10.

LIST OF REFERENCE NUMERALS 1 operating liquid tank/fuel tank
10 tank wall
11 inner face (of the tank wall)
12 outer face (of the tank wall)
13 operating liquid tank interior
21 first stiffening structure/first tensile ribbon
22 second stiffening structure/second tensile ribbon
30 bonding pin
31 undercut (in the bonding pin)
N normal vector/normal direction (of the tank wall)
P internal pressure (in the operating liquid tank)

The invention claimed is:

1. An operating liquid tank (1) for a motor vehicle having a tank wall (10) that bounds an operating liquid tank interior (13), comprising:
   a first fiber-reinforced stiffening structure (21) and a second fiber-reinforced stiffening structure (22), wherein
   the first stiffening structure (21) is bonded to an inner face (11) of the tank wall (10), wherein the inner face (11) of the tank wall (10) faces and directly contacts the operating liquid tank interior (13), and the second stiffening structure (22) is bonded to an outer face (12) of the tank wall (10), wherein the outer face (12) of the tank wall (10) faces away from the operating liquid tank interior (13);
   the tank wall (10), at least in sections, is in a sandwich arrangement between the first stiffening structure (21) and the second stiffening structure (22), in such a way that the first stiffening structure (21) and the second stiffening structure (22), at least in sections, are in an overlapping arrangement;
   the operating liquid tank is configured for installation in a motor vehicle to provide operating liquid to the motor vehicle; and
   the tank wall (10) is a wall devoid of seams.

2. The operating liquid tank (1) of claim 1, wherein the tank wall (10) is in a sandwich arrangement between the first stiffening structure (21) and the second stiffening structure (22), in such a way that, in a top view of the tank wall (10), the first stiffening structure (21) and the second stiffening structure (22) run flush to one another.

3. The operating liquid tank (1) of claim 1, wherein the first stiffening structure (21) takes the form of a fiber-reinforced tensile first ribbon (21), and/or in that the second stiffening structure (22) takes the form of a fiber-reinforced tensile second ribbon (22).

4. The operating liquid tank (1) of claim 1, wherein the first stiffening structure (21) takes the form of a first organosheet, and/or in that the second stiffening structure (22) takes the form of a second organosheet.

5. The operating liquid tank (1) of claim 1, wherein
the first stiffening structure (21) is secured to two spaced-apart securing regions on the inner face (11) of the tank wall (10); and/or
the second stiffening structure (22) is secured to two spaced-apart securing regions on the outer face (12) of the tank wall (10).

6. The operating liquid tank (1) of claim 1, wherein
the first stiffening structure (21) is bonded on the inner face (11) of the tank wall (10) along a bonding line having at least one extension component that runs at right angles to a fiber direction of reinforcing fibers within the first stiffening structure (21); and/or
the second stiffening structure (22) is bonded on the outer face (12) of the tank wall (10) along a bonding line having at least one extension component that runs at right angles to a fiber direction of reinforcing fibers within the second stiffening structure (22).

7. The operating liquid tank (1) of claim 1, wherein
the first stiffening structure (21) is in a circumferential arrangement within the operating liquid tank (1); and/or
the second stiffening structure (22) is in a circumferential arrangement within the operating liquid tank (1).

8. The operating liquid tank (1) of claim 1, wherein
the operating liquid tank (1) has at least two first fiber-reinforced stiffening structures (21), each of which is bonded to the inner face (11) of the tank wall (10) that faces the operating liquid tank interior (13); and
the two first stiffening structures (21) are in a crossed arrangement such that the reinforcing fibers thereof run at an angle to one another.

9. The operating liquid tank (1) of claim 1, wherein
the operating liquid tank (1) has at least two second fiber-reinforced stiffening structures (22), each of which is bonded to the outer face (12) of the tank wall (10) that faces away from the operating liquid tank interior (13); and
the two second stiffening structures (22) are in a crossed arrangement such that the reinforcing fibers thereof run at an angle to one another.

10. The operating liquid tank (1) of claim 1, wherein the first stiffening structure (21) and/or the second stiffening structure (22) is cohesively bonded to the tank wall (10).

11. The operating liquid tank (1) of claim 1, wherein
the first stiffening structure (21) is bonded to the tank wall (10) by means of an adhesion promoter layer disposed between the first stiffening structure (21) and the inner face (11) of the tank wall (10), and/or
the second stiffening structure (22) is bonded to the tank wall (10) by means of an adhesion promoter layer disposed between the second stiffening structure (22) and the outer face (12) of the tank wall (10).

12. The operating liquid tank (1) of claim 1, wherein
the first stiffening structure (21) is bonded to the tank wall (10) by means of a rivet bond that penetrates the first stiffening structure (21), and/or
the second stiffening structure (22) is bonded to the tank wall (10) by means of a rivet bond that penetrates the second stiffening structure (22).

13. The operating liquid tank (1) of claim 1, wherein
the first stiffening structure (21) has at least one bonding pin (30) that faces the inner face (11) of the tank wall (10) and has an undercut (31), where the bonding pin (30) has penetrated into the tank wall (10) such that the undercut (31) has merged into the tank wall (10) and the first stiffening structure (21) is bonded in a form-fitting manner to the tank wall (10), and/or
the second stiffening structure (22) has at least one bonding pin (30) that faces the outer face (12) of the tank wall (10) and has an undercut (31), where the bonding pin (30) has penetrated into the tank wall (10) such that the undercut (31) has merged into the tank wall (10) and the second stiffening structure (22) is bonded in a form-fitting manner to the tank wall (10).

14. The operating liquid tank (1) of claim 8, wherein
the two first stiffening structures (21) are in a crossed arrangement such that the reinforcing fibers thereof run at right angles to one another.

15. The operating liquid tank (1) of claim 9, wherein
the two second stiffening structures (22) are in a crossed arrangement such that the reinforcing fibers thereof run at right angles to one another.

\* \* \* \* \*